(No Model.)
C. H. DOUGLAS.
Saw.
No. 236,876. Patented Jan. 25, 1881.
*Fig. 1.*
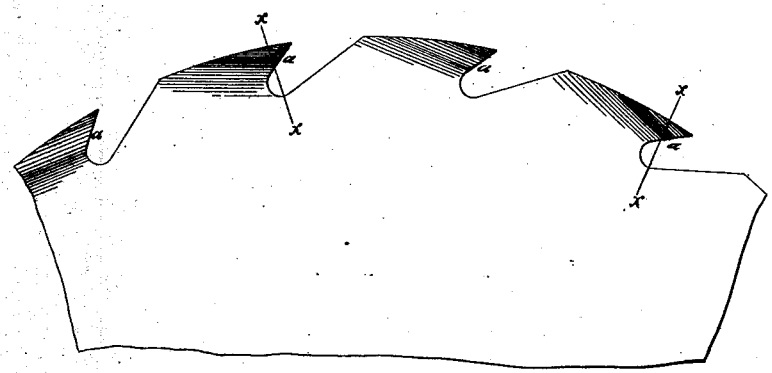
*Fig. 2.*
*Fig. 3.*
WITNESSES.
Otto Block
W. A. Marean
INVENTOR.
Charles H. Douglas
By his Attorney

UNITED STATES PATENT OFFICE.

CHARLES H. DOUGLAS, OF CHICAGO, ILLINOIS, ASSIGNOR OF ONE-HALF TO GEORGE FARNSWORTH, OF SAME PLACE, AND JAMES L. GAGE, OF ROCHESTER, NEW YORK.

SAW.

SPECIFICATION forming part of Letters Patent No. 236,876, dated January 25, 1881.

Application filed March 4, 1880. (No model.)

*To all whom it may concern:*

Be it known that I, CHARLES H. DOUGLAS, of Chicago, in Cook county, in the State of Illinois, have invented a new and useful Improvement in Saws, which improvement is fully set forth in the following specification, reference being had to the accompanying drawings.

The object of my invention is to form a saw-tooth into such a shape that it will plane the lumber and leave the face of the material smooth, as if planed by the ordinary process, thereby doing away with the ordinary plane and producing lumber from the saw fit for use where it is required to be smooth.

Figure 1 is side elevation of a segment of the saw. Figs 2 and 3 are vertical sections through Fig. 1 at $x$ $x$.

My invention consists in swaging or pressing the tooth of a saw near its top slightly beyond the surface thereof, the line of bend being lengthwise of the tooth, then swaging or pressing a portion of that inclined part back until it is parallel with the face of the saw, or nearly so, as shown at $a$. This can be done by hammering, or by a die that will at one operation form the tooth into the shape shown in Figs. 1 and 2, or it can be done by dressing the side of the projecting part off until it is parallel to the surface of the saw, or nearly so, each alternate tooth being so finished on opposite sides to the other. The effect of the tooth being made in this shape is to make a clean cut, thereby cutting the timber smoothly and leaving it unscored as by the common tooth, although the end of the grain of wood is presented to the saw instead of the side, and even in presenting the side it is left as if planed.

The great difference in the shape of the teeth of my saw and the old saw is in the setting of the teeth, the line of bend in the old mode of setting being across the tooth, while mine is in the line of the length of the tooth. By this line of bend I am enabled to get a stronger and longer projection to the tooth, thereby sustaining it and preventing it from losing its set. The back of the tooth is dressed only to a slight incline to the cut of the saw, (shown in Fig. 1,) that being gaged by the cut to be performed by each tooth.

I claim—

A saw provided with teeth having a projection, $a$, on one side thereof, longest in the line of the cut of the tooth from the point backward, on which there is a flat surface parallel, or nearly so, with the face of the saw, all the teeth in the saw being constructed in the manner shown and projecting at either side of the saw, substantially as and for the purpose specified.

CHARLES H. DOUGLAS.

Witnesses:
JAS. LORENZO GAGE,
Mrs. J. W. CONKLING.